US010753006B2

(12) United States Patent
Gurt Santanach et al.

(10) Patent No.: US 10,753,006 B2
(45) Date of Patent: Aug. 25, 2020

(54) AIRCRAFT ENGINE PART INCLUDING A COATING FOR PROTECTION AGAINST EROSION, AND A METHOD OF FABRICATING SUCH A PART

(71) Applicants: Safran Helicopter Engines, Bordes (FR); SAFRAN, Paris (FR)

(72) Inventors: Julien Gurt Santanach, Saint Vincent de Tyrosse (FR); Alain Viola, Griesheim Pres Molsheim (FR); Fabrice Crabos, Assat (FR)

(73) Assignees: Safran Helicopter Engines, Bordes (FR); SAFRAN, Paris (FR)

( * ) Notice: Subject to any disclaimer, the term of this patent is extended or adjusted under 35 U.S.C. 154(b) by 204 days.

(21) Appl. No.: 15/776,576

(22) PCT Filed: Nov. 11, 2016

(86) PCT No.: PCT/FR2016/052967
§ 371 (c)(1),
(2) Date: May 16, 2018

(87) PCT Pub. No.: WO2017/085400
PCT Pub. Date: May 26, 2017

(65) Prior Publication Data
US 2018/0327921 A1     Nov. 15, 2018

(30) Foreign Application Priority Data

Nov. 19, 2015   (FR) ...................... 15 61118

(51) Int. Cl.
*C25D 3/06*     (2006.01)
*C25D 5/50*     (2006.01)
(Continued)

(52) U.S. Cl.
CPC ................ *C25D 3/06* (2013.01); *B32B 15/04* (2013.01); *B32B 15/16* (2013.01); *B32B 33/00* (2013.01);
(Continued)

(58) Field of Classification Search
CPC . C25D 5/50; C25D 3/06; C25D 15/00; C25D 7/008; B32B 33/00; B32B 15/16; B32B 15/04
See application file for complete search history.

(56) References Cited

U.S. PATENT DOCUMENTS 3,951,612 A     4/1976  Gates et al.
4,666,733 A     5/1987  Wlodek
(Continued)

FOREIGN PATENT DOCUMENTS

CN      103726091 A     4/2014
EP      0 747 510 A1    12/1996
(Continued)

OTHER PUBLICATIONS

P. Pearson, "The History and Future of Aircraft Turbine Engine Bearing Steels," in Bearing Steels: Into the 21st Century, edited by Hoo, J. and Green, W. (West Conshohocken, PA: ASTM International, 1998), 335-353. https://doi.org/10.1520/STP12138S.*
(Continued)

*Primary Examiner* — Jessee R Roe
(74) *Attorney, Agent, or Firm* — Oblon, McClelland, Maier & Neustadt, L.L.P.

(57) ABSTRACT

An aircraft engine-part including at least a metal substrate and a protective coating for protection against erosion that is present on the substrate, the coating including at least one phase including at least chromium at an atom content greater than or equal to 45% and carbon at an atom content lying in the range 5% to 20%, the phase including $Cr_7C_3$ and $Cr_{23}C_6$ chromium carbides. A method of fabricating such a part in (Continued)

which electroplating is used to deposit a coating composition on the part and the part is subjected to heat treatment at a temperature lying in the range 250° C. to 70° C.

20 Claims, 2 Drawing Sheets

(51) Int. Cl.
    *B32B 33/00*     (2006.01)
    *C25D 15/00*     (2006.01)
    *B32B 15/16*     (2006.01)
    *C22C 3/00*     (2006.01)
    *B32B 15/04*     (2006.01)
    *C25D 7/00*     (2006.01)
    *C25D 5/34*     (2006.01)

(52) U.S. Cl.
    CPC .................. *C22C 3/00* (2013.01); *C25D 5/50* (2013.01); *C25D 7/008* (2013.01); *C25D 15/00* (2013.01); *C25D 5/34* (2013.01)

(56) References Cited

U.S. PATENT DOCUMENTS

2015/0101934 A1     4/2015    Dardona et al.
2016/0153106 A1     6/2016    Hugot et al.

FOREIGN PATENT DOCUMENTS

FR            2 601 044 A1    1/1986
GB           2 180 558 A     4/1987
WO    WO 2015/007983 A2    1/2015

OTHER PUBLICATIONS

Z. Abdel Hamid et al., "Electrodeposition and Characterization of Chromium-tungsten Carbide Composite Coatings From a Trivalent Chromium Bath", Surface and interface analysis, 2005, pp. 573-579.

L.H. Jiang et al., "Characteristics of Trivalent Chromium-carbon Alloys Coatings by Using Pulse Electroplating", Journal of Chinese Corrosion Engineering, (English Abstract and Unedited Computer-Generated English Translation only), 2013, 10 pages.

S.C. Kwong et al., "Characterization of Intermediate Cr—C layer Fabricated by Electrodeposition in Hexavalent and Trivalent Chromium Baths", Surface and Coatings Technology, 2004, pp. 151-156.

International Search Report dated Feb. 15, 2017, in PCT/FR2016/052967 filed Nov. 16, 2016.

* cited by examiner

AIRCRAFT ENGINE PART INCLUDING A COATING FOR PROTECTION AGAINST EROSION, AND A METHOD OF FABRICATING SUCH A PART

BACKGROUND OF THE INVENTION

The present invention relates to the general field of coatings for protection against erosion. More particularly, the invention relates to an aircraft engine part coated in a coating for protection against erosion.

In operation, airplane or helicopter engines suck in large quantities of air. The air that is sucked in is subsequently compressed in order to feed the combustion chamber with oxidizer. The air may carry particles of greater or smaller hardness that strike the stationary or moving parts inside the engine. Thus, the parts impacted by such particles at high speed can have their shapes modified by erosion, which can lead to failures of the engine.

It is known to make use of sand filters, in particular in helicopter engines, in order to reduce the presence of particles in the engine. Nevertheless, such filters allow a small quantity of particles to pass through, which suffices to damage the parts of the engine in the long term.

It is also known to use anti-erosion coatings that are deposited on the parts of the engine that are subjected to erosion. For example, it is known, to deposit metal nitrides (of the TiN, TiAlN, AlCrN, etc. type) on a part by physical vapor deposition (PVD) or by chemical vapor deposition (CVD). Nevertheless, such coatings generally do not withstand sufficiently the temperatures needed for making the part, and the methods serving to form such coatings do not make it possible to coat parts that are complex in shape.

It is also known to deposit a coating based on hexavalent chromium on metal parts by electrodeposition. Such a method is capable of coating parts that are complex in shape. Nevertheless, such coatings generally do not present sufficient hardness for the above-mentioned application to withstanding erosion.

Document GB 2 180 558 discloses a method of fabricating a chromium-based coating that includes a step of depositing chromium and chromium carbides $Cr_3C_2$ on a metal alloy part by plasma spraying, and a step of heat treating the coating for a duration of longer than 200 hours (h). That method is not suitable for treating parts of complex shapes and it presents the drawback of taking a long time, in particular because of the long duration of the heat treatment.

There therefore exists a need to have an aircraft engine part coated in a coating for protection against erosion that does not present the above-mentioned drawbacks, and also a method of fabricating such a part.

OBJECT AND SUMMARY OF THE INVENTION

A main object of the present invention is thus to mitigate such drawbacks by proposing an aircraft engine part coated in a coating for protection against erosion that presents resistance to erosion that is satisfactory under the operating conditions of an aircraft, engine, and that can be fabricated simply, even when the part is complex in shape.

This object is achieved with a method of fabricating an aircraft engine part comprising at least a metal substrate and a protective coating for protection against erosion that is present on the substrate, the coating comprising at least one phase comprising at least chromium at an atom content greater than or equal to 45% and carbon at an atom content lying in the range 5% to 20%, said phase comprising $Cr_7C_3$ and $Cr_{23}C_6$ chromium carbides.

The presence of $Cr_7C_3$ and $Cr_{23}C_6$ chromium carbides in the coating serves advantageously to improve significantly the resistance to erosion of the coated part. As described in detail below, such chromium carbides are formed as a result of applying heat treatment to a coating composition based on chromium and carbon that is formed on the substrate. Thus, in the invention, applying heat treatment serves to reinforce the coating that has been formed by causing the $Cr_7C_3$ and $Cr_{23}C_6$ carbides to precipitate. Such an effect is unexpected insofar as conventionally, using prior art chromium-based coatings, applying heat treatment after deposition on the part has the effect of reducing significantly the hardness of the coating.

Thus, in the invention, choosing to make on the substrate a chromium/carbon deposit that presents a particular content, at carbon serves advantageously, after heat treatment, to form a coating having $Cr_7C_3$ and $Cr_{23}C_6$ chromium carbides that, present good resistance to erosion in the environment of an aircraft engine; and also good adhesion to the underlying substrate. The presence of $Cr_7C_3$ and $Cr_{23}C_6$ carbides can be detected in particular by X-ray diffraction (XRD). The atom content of carbon in the coating needs to be greater than 5% in order to form $Cr_7C_3$ and $Cr_{23}C_6$ carbides that are sufficient to improve significantly the hardness of the coating. Nevertheless, this carbon content must be less than 20% in order to avoid affecting the mechanical strength of the coating.

The coating of the part of the invention may advantageously present high hardness, e.g. greater than 1500 on the Vickers scale (HV). It should be observed that the coating may also include oxygen, in proportions that depend on the method of fabricating the coating.

The coating phase preferably has chromium at an atom content lying in the range 48% to 58% and carbon at an atom content lying in the range 8% to 18%.

The coating phase may include chromium at an atom content in the range 45% to 80% and carbon at an atom content in the range 5% to 20%. Optionally, the coating phase may include oxygen at an atom content lying in the range 15% to 40%, and possibly also other elements at an atom content of less than or equal to 4%, or indeed lying in the range 0.5% to 4%.

In an embodiment, the coating phase may comprise carbon at an atom content lying in the range 12% to 18%.

In an embodiment, the coating phase may comprise chromium at an atom content lying in the range 45% to 55%, e.g. in the range 48% to 52%.

In an embodiment, chromium is the only metal element in the coating phase.

Preferably, the coating further includes metal particles and/or ceramic particles. In addition, the volume content in the coating of metal particles and/or ceramic particles may be less than 20%, or may lie in the range 5% to 15%. By way of example, such metal particles may be particles of tungsten or nickel, with tungsten being preferred since it is heavier and tougher. By way of example, such ceramic particles may be particles of alumina or zirconia. The particles are preferably dispersed in the coating phase containing chromium and carbon, said phase then acting as a matrix for the particles. The particles serve to further increase erosion resistance, in particular when faced with ingested particles of larger size.

The metal particles and/or the ceramic particles may have a size greater than or equal to 1 micrometer (μm). The metal particles and/or the ceramic particles may be of a size that is less than or equal to 30 µm, e.g. lying in the range 1 µm to 30 µm. The term "size" is used to mean the $D_{50}$ mean size of the particles.

Preferably, a thickness of the coating lies in the range 5 µm to 100 µm.

The substrate may be made of steel, an aluminum-based alloy, a titanium-based alloy, a nickel-based alloy, or any other metal material suitable for use in a gas turbine.

The part may constitute an aircraft engine part selected from the following: at least, a portion of a diffuser; at least a portion of an axial or centrifugal compressor; at least a portion of a nozzle; or any other part used in a turbine and that might be subjected to a stream of air.

In another aspect, the invention also provides a method of fabricating a part as set out above, the method comprising at least the following steps:

depositing on the substrate a coating composition comprising at least chromium at an atom content greater than or equal to 45% and carbon at an atom content lying in the range 5% to 20%; and subjecting the part coated with said composition to heat treatment at a temperature lying in the range 250° C. to 700°, in order to obtain the coating.

As explained above, the heat treatment serves to obtain a coating with improved hardness as a result of chromium carbides precipitating and coalescing. Before heat treatment, the $Cr_7C_3$ and $Cr_{23}C_6$ chromium carbides cannot be detected by X-ray diffraction (XRD) in the composition of the coating. The coating may have no such carbides. In a variant, the coating composition may already contain $Cr_7C_3$ and $Cr_{23}C_6$ carbides, but presenting a mean size ($D_{50}$) less than or equal to 10 nanometers (nm), thus preventing them from being detected by XRD.

The temperature of heat treatment may preferably lie in the range 300° C. to 600° C., or more preferably in the range 300° C. to 500° C., for example in the range 400° C. to 500° C. The duration of the heat treatment may be adapted in particular as a function of the hardness desired for the coating. The duration of the heat treatment may be longer than 10 minutes (min), e.g. longer than 15 min or indeed longer than 30 min. By way of example, the duration of the heat treatment may lie in the range 15 min to 280 min. The duration of the heat treatment may be adapted as a function of the selected temperature and of the hardness desired for the coating.

Furthermore, the coating composition is deposited on the substrate by electroplating from an electrolyte bath comprising at least trivalent chromium and an organic compound. Under such circumstances, the part for coating may constitute the cathode of the electroplating device so that chromium ion reduction takes place on the part. Such a step of deposition by electroplating is advantageous since it enables the coating composition to be deposited easily on parts of complex shape, while ensuring greater control over the formation of the coating. Specifically, it is easy to modify the electroplating parameters such as voltage, current, or electrode area, e.g. in order to obtain fine control over the thickness of the coating, the speed with which it is formed, and the microstructure of the coating. In addition, the presence of trivalent chromium which is generally complex by organic ligands in the electrolyte bath, makes it possible to deposit the chromium and the carbon of the coating simultaneously. It should be observed that oxygen may also be incorporated in the coating on the part by this method.

Depositing the coating composition by electroplating serves to reduce the duration of the heat treatment that is performed after deposition. Specifically, electroplating makes it possible to obtain a uniform distribution of carbon in the coating composition that has been deposited, which is generally not possible with other deposition techniques such as plasma spraying. Advantageously, this uniform distribution of carbon then makes it possible to reduce the duration of the subsequent heat treatment needed to form or develop the $Cr_7C_3$ and $Cr_{23}C_6$ chromium carbides in order to increase the hardness of the coating.

Also preferably, the electrolyte bath further comprises metal particles and/or ceramic particles in suspension. During electroplating of the coating composition, the particles in suspension are incorporated in the coating composition in a manner that is uniform and continuous. Thus, no additional step is needed for incorporating the particles in the coating.

Current may be applied continuously or as pulses during electroplating. Selecting between continuous or pulsed current generally depends on the microstructure and the thickness that are desired for the coating.

The method may also include a step of degreasing the surface of the substrate and a step of preparing the surface of the substrate prior to the step of depositing the coating composition on the substrate. The step of preparing the surface may for example be performed, by chemical etching (e.g. acid etching), by sandblasting, etc.

BRIEF DESCRIPTION OF THE DRAWINGS

Other characteristics and advantages of the present invention appear from the following description made with reference to the accompanying drawings. In the figures.

DETAILED DESCRIPTION OF THE INVENTION

Throughout the disclosure, the term "lying in the range . . . to . . . " should be understood as including the bounds.

Figure 1:
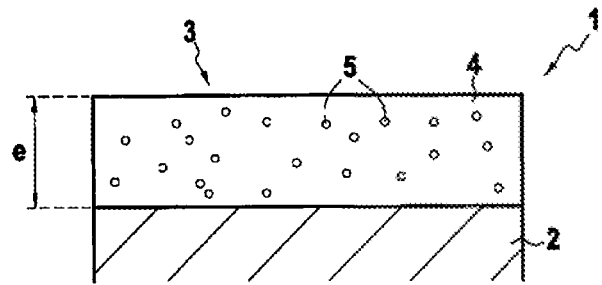
FIG. 1 is a diagrammatic section view of an aircraft engine part coated in an erosion protection coating.

FIG. 1 is a diagrammatic section view showing the surface of a part 1 of an aircraft engine of the invention, e.g. constituted by a turboshaft engine diffuser.

Such a part 1 comprises a metal substrate 2, e.g. made of steel, aluminum, titanium, an aluminum-based alloy, a titanium-based alloy, or a nickel-based alloy. The substrate 2 is coated by a protective coating 3 for protection against erosion. The erosion protective coating 3 in this example is in direct contact with the substrate 2 and covers it. The coating 3 preferably presents thickness e lying in the range 5 µm to 100 µm.

In accordance with the invention, the coating 3 comprises a phase 4 constituting the majority by weight in the coating that is based on chromium and carbon. More precisely, the phase 4 comprises chromium at an atom content greater than or equal to 45%, and carbon at an atom content lying in the range 5% to 20%. The chromium and the carbon within the phase 4 of the coating 3 are present in particular in the form of chromium carbides of the $Cr_7C_3$ and $Cr_{23}C_6$ type.

The coating 3 may also include a disperse phase 5 that is dispersed within the chromium and carbon phase 4 and that comprises metal and/or ceramic particles. By way of example, such metal particles may be particles of tungsten or of nickel. By way of example, such ceramic particles may be particles of alumina or of zirconia. The volume content in the coating of metal particles and/or of ceramic particles is preferably less than 20%, or more preferably lies in the range 5% to 15%. The metal particles and/or ceramic particles may have a size lying in the range 1 µm to 30 µm.

Thus, the coating may be made up of a phase 4 comprising chromium and carbon that has metal particles and/or ceramic particles 5 dispersed therein. In a variant that is not shown, the coating 3 may be formed solely by the phase 4 comprising chromium and carbon.

Figure 2:
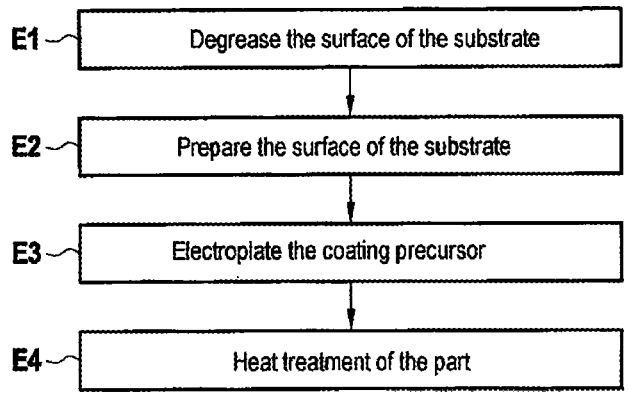
FIG. 2 is a flow chart showing the main steps of a method of fabricating a coated part of the invention.
Figure 3:
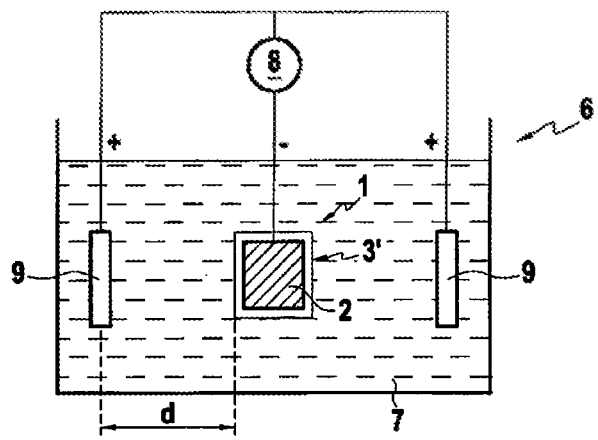
FIG. 3 is a diagrammatic section view of a device used for electroplating a coating composition of the invention.

A method of fabricating an aircraft engine part 1 of the invention is described below with reference to the flow chart of FIG. 2 and to the diagram of FIG. 3 showing an electroplating device 6. The method described below includes a step of electroplating a coating composition 3'. Naturally, the invention is not limited to depositing the coating composition by electroplating, and other techniques sire available for obtaining the coated part of the invention. By way of example, mention may be made of the techniques of physical vapor deposition, chemical vapor deposition, or indeed cementation.

A first step of the method (step E1) may consist in decreasing the surface of the substrate on which a coating composition is to be deposited, e.g. by using an aqueous degreasing solution. Thereafter, the surface of the substrate may be prepared (step E2) in order to ensure that the electroplating is uniform over the substrate 2 and in order to increase its effectiveness. In order to prepare the surface, it is possible in known manner to subject it to sandblasting, chemical etching (e.g. with an acid solution), etc.

Thereafter, it is possible to prepare an electrolyte bath 7 that contains at least ions of chromium (III) (trivalent chromium), and an organic complexing compound for chromium ions. By way of example, recourse may be had to known aqueous solutions comprising chromium (III) chloride and a carboxylic acid as a complexing agent. The electrolyte bath 7 may optionally be heated during the electroplating step. In addition, the electrolyte bath may include metal and/or ceramic particles in suspension, of the type mentioned above, so that they become integrated in the coating composition during electroplating.

The part 1 with its prepared surface can then be connected to the negative terminal (acting as a cathode) of an electricity generator 8 and can be immersed in the electrolyte bath 7 as prepared beforehand. In the FIG. 3 device, two electrodes 9 acting as anodes are connected to the positive terminal of the generator 8 and immersed in the bath 7 so that the part 1 lies between the two electrodes 9 in the bath. The ratio of the area of the anode (corresponding to the working area of the two electrodes 9) divided by the area of the cathode (corresponding to the area of the substrate 2 of the part that is to be coated) is preferably about 4. The electrodes 9 forming the anodes are preferably spaced apart from the surface of the part, by a distance d lying in the range 1 centimeter (cm) to 20 cm.

The generator 8 is then switched on in order to start electroplating the coating composition 3' on the part (step E3). During this step, the chromium (III) is reduced on the substrate 2 of the part 1 so as to form the coating composition 3' comprising chromium, carbon (coming from the organic compound present in the bath) and metal and/or ceramic particles that were in suspension in the bath. Parameters such as current density, bath temperature, and the duration of electroplating may be adapted, in particular as a function of the thickness of the coating that it is desired to obtain. In addition, it is possible to perform electroplating while using direct current (DC) either continuously or in the form of pulses.

Once the part has been coated with the coating composition 3', it is rinsed and dried, and then placed in an oven. The part 1 with the coating composition 3' is then subjected to heat treatment (step E4) at a temperature that preferably lies in the range 250° C. to 700° C., or more preferably lies in the range 300° C. to 600° C., or even more preferably that lies in the range 400° C. to 500° C. The heat treatment may be performed under an inert atmosphere. The duration of the heat treatment may be longer than 10 min, e.g. longer than 15 min or even longer than 30 min. The duration of the heat treatment may for example lie in the range 15 min to 280 min. The duration of the heat treatment may be adapted as a function of the selected temperature and of the hardness desired for the coating.

The coating 3 of the part 1 of the invention that is obtained at the end of the heat treatment step may present hardness greater than 1500 HV and it may present sufficient resistance to erosion for an application in an aircraft engine.

By way of example, the part 1 may constitute at least a portion of a turboprop diffuser, at least a portion of an axial or centrifugal compressor, e.g. a centrifugal impeller, at least a portion of a nozzle, or any other part of a turbine engine that is to be subjected to a stream of air.

EXAMPLE 1

In the example below, a steel turboprop diffuser part was coated in a coating by a method of the invention. The surfaces for coating were previously degreased and prepared.

The coating composition was deposited by electroplating in an electrolyte bath. The electrolyte bath used was an aqueous solution comprising:

0.39 moles per liter (mol/L) of chromium (III) chloride hexahydrate ($CrCl_3$; $6H_2O$);

3.72 mol/L of ammonium formiate ($NH_4COOH$); and 0.81 mol/L of potassium chloride (KCl).

The bath was heated to about 35° C. in order to perform electroplating. The part was immersed in the bath and connected to the negative terminal of the electricity generator. The anode-forming electrodes were immersed in the bath and connected to the generator, as described above. The ratio of anode area divided by cathode area was equal to 4.

A continuous current density of 40 amps per square decimeter ($A/dm^2$) was applied for 180 min so as to form the coating composition on the substrate. Once electroplating had been performed, the part was rinsed and dried.

Finally, the part coated in the coating composition was placed in an oven, and subjected to heat treatment at 500° C. for 1 hour (h).

The coating presented a thickness of about 35 µm.

The hardness of the coating formed in that way was about 2050 HV.

The chemical composition of the coating as formed in that way (atom contents) as evaluated by X-ray photoelectron spectrometry (XPS) is given in Table 1 below.

TABLE 1

| Atom contents of elements in the coating | | | | |
|---|---|---|---|---|
| Element | C | Cr | N | O |
| at % | 15.4 | 52.6 | 1.4 | 30.6 |

Analysis of the coating by XRD also showed the presence of chromium carbides of the $Cr_7C_3$ and $Cr_{23}C_6$ type.

EXAMPLE 2

Figure 4A:
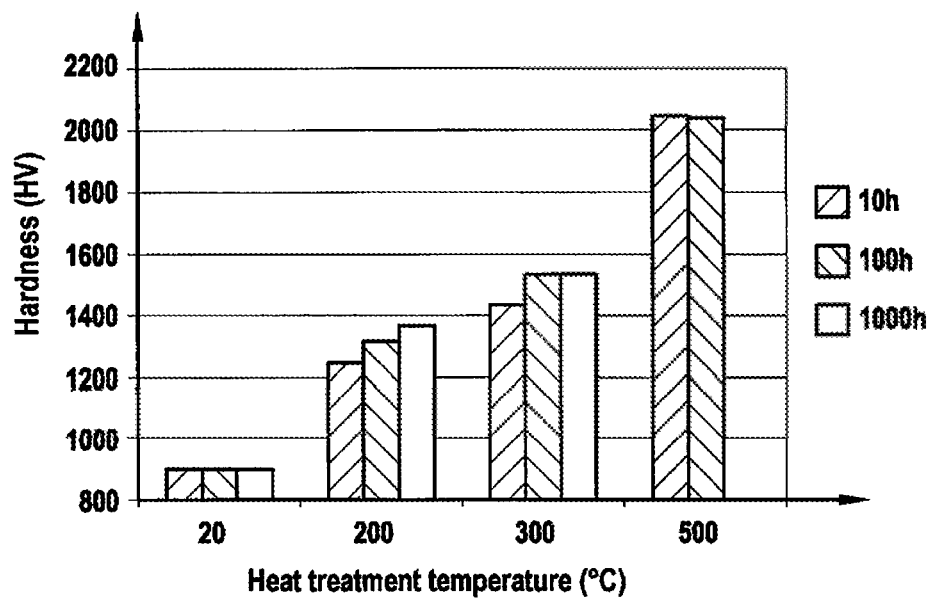
FIG. 4A shows the influence of the temperature of the heat treatment on the hardness of the coating of a part of the invention.

Eleven steel substrates were coated under the same conditions as in Example 1, while varying the parameters of the heat treatment, (temperature and duration). The results are shown in the graph of FIG. 4A.

Figure 4B:
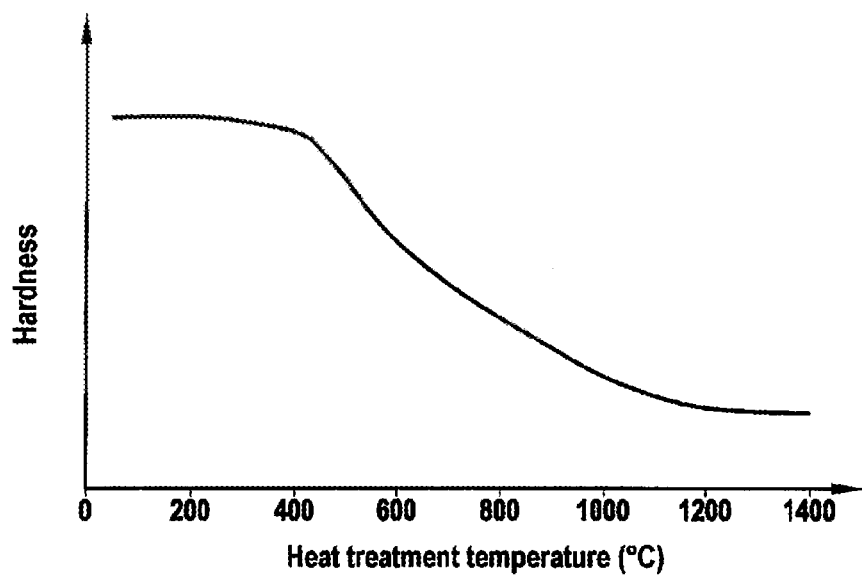
FIG. 4B shows the influence of the temperature of heat treatment after depositing a chromium-based coating in the prior art.

FIG. 4B reproduces a graph showing the variation in the hardness of a chromium-based coating deposited by electroplating using a solution of chromium (VI) on a substrate as a function of the temperature of the heat treatment performed after deposition. The electrolyte bath used was a standard solution based on chromic acid having a composition of about 250 grams per liter (g/L) of $CrO_3$, the solution also comprising 2.5 g/L of sulfuric acid $H_2SO_4$. In order to perform deposition, a current density of 40 A/dm² was used. This data is taken from the work by F. Durut: "Recherche des mécanismes microstructuraux qui régissent les propriétés macroscopiques de depôts de chrome: influence des paramètres d'elaboration" [Research into microstructural mechanisms that govern the macroscopic properties of chromium deposits: influence of preparation parameters], Engineering Sciences (physics, Ecole Rationale Superieure des Mines de Saint-Etienne, 1999.

For the prior art chromium-based coating (FIG. 4B), it can be seen that heat treatment performed after deposition does not increase the hardness of the coating. More precisely, it can be seen that the hardness varies little or not at all for heat treatment temperatures up to 400° C., after which it decreases.

Conversely, for the coating of a part of the invention comprising chromium and carbon (FIG. 4A), it can be seen that the hardness of the coating increases with the temperature of the heat treatment performed after deposition. This figure also shows that the duration of the heat treatment has little incidence on the hardness of the coating for heat treatment durations longer than 10 h.

The invention claimed is:

1. A method of fabricating an aircraft engine part comprising at least a metal substrate and a protective coating for protection against erosion that is present on the substrate, the coating comprising at least one phase comprising at least chromium at an atom content lying in the range of 45% to 58% and carbon at an atom content lying in the range of 5% to 20%, said phase comprising $Cr_7C_3$ and $Cr_{23}C_6$ chromium carbides, the method comprising at least the following steps:
  depositing on the substrate a coating composition comprising at least chromium at an atom content greater than or equal to 45% and carbon at an atom content lying in the range of 5% to 20%, the coating composition being deposited on the substrate by electroplating from an electrolyte bath comprising at least trivalent chromium and an organic compound; and
  subjecting the part coated with said composition to heat treatment at a temperature lying in the range of 250° C. to 700°, in order to obtain the coating.

2. The method according to claim 1, wherein the heat treatment temperature lies in the range of 300° C. to 600° C.

3. The method according to claim 1, wherein the electrolyte bath further comprises metal particles and/or ceramic particles in suspension, the resulting coating further including metal particles and/or ceramic particles.

4. The method according to claim 1, wherein a thickness of the coating lies in the range of 5 µm to 100 µm.

5. The method according claim 1, wherein the substrate is made of steel, of aluminum-based alloy, of titanium-based alloy, or of nickel-based alloy.

6. The method according to claim 1, wherein the part constitutes an aircraft engine part selected from the following: at least a portion of a diffuser; at least a portion of an axial or centrifugal compressor; at least a portion of a nozzle.

7. The method according to claim 1, wherein the duration of the heat treatment lies in the range of 15 min to 280 min.

8. The method according to claim 1, wherein the at least one phase comprises carbon at an atom content lying in the range of 12% to 18%.

9. The method according to claim 1, wherein the at least one phase comprises chromium at an atom content lying in the range of 45% to 55%.

10. A method of fabricating an aircraft engine part comprising at least a metal substrate and a protective coating for protection against erosion that is present on the substrate, the coating comprising at least one phase comprising at least chromium at an atom content greater than or equal to 45% and carbon at an atom content lying in the range of 5% to 20%, said phase comprising $Cr_7C_3$, and $Cr_{23}C_6$ chromium carbides, the method comprising at least the following steps:
  depositing on the substrate a coating composition comprising at least chromium at an atom content greater than or equal to 45% and carbon at an atom content lying in the range of 5% to 20%, the coating composition being deposited on the substrate by electroplating from an electrolyte bath comprising at least trivalent chromium and an organic compound; and
  subjecting the part coated with said composition to heat treatment at a temperature lying in the range of 250° C. to 700°, in order to obtain the coating,
  wherein the electrolyte bath further comprises metal particles and/or ceramic particles in suspension, the resulting coating further including metal particles and/or ceramic particles.

11. The method according to claim 10, wherein the heat treatment temperature lies in the range of 300° C. to 600° C.

12. The method according to claim 10, wherein a thickness of the coating lies in the range of 5 µm to 100 µm.

13. The method according claim 10, wherein the substrate is made of steel, of aluminum-based alloy, of titanium-based alloy, or of nickel-based alloy.

14. The method according to claim 10, wherein the part constitutes an aircraft engine part selected from the following: at least a portion of a diffuser; at least a portion of an axial or centrifugal compressor; at least a portion of a nozzle.

15. The method according to claim 10, wherein the duration of the heat treatment lies in the range of 15 minutes to 280 minutes.

16. A method of fabricating an aircraft engine part comprising at least a metal substrate and a protective coating for protection against erosion that is present on the substrate, the coating comprising at least one phase comprising at least chromium at an atom content greater than or equal to 45% and carbon at an atom content lying in the range of 5% to 20%, said phase comprising $Cr_7C_3$ and $Cr_{23}C_6$ chromium carbides, the method comprising at least the following steps:

depositing on the substrate a coating composition comprising at least chromium at an atom content greater than or equal to 45% and carbon at an atom content lying in the range of 5% to 20%, the coating composition being deposited on the substrate by electroplating from an electrolyte bath comprising at least trivalent chromium and an organic compound; and subjecting the part coated with said composition to heat treatment at a temperature lying in the range of 250° C. to 700°, in order to obtain the coating, wherein the part constitutes an aircraft engine part selected from the following: at least a portion of a diffuser; at least a portion of an axial or centrifugal compressor; at least a portion of a nozzle.

17. The method according to claim 16, wherein the heat treatment temperature lies in the range of 300° C. to 600° C.

18. The method according to claim 16, wherein a thickness of the coating lies in the range of 5 μm to 100 μm.

19. The method according claim 16, Wherein the substrate is made of steel, of aluminum-based alloy, of titanium-based alloy, or of nickel-based alloy.

20. The method according to claim 16, wherein the at least one phase comprises carbon at an atom content lying in the range of 12% to 18%.

* * * * *